G. B. FURMAN.
SPRAYING DEVICE.
APPLICATION FILED FEB. 3, 1915.
1,268,232.
Patented June 4, 1918.
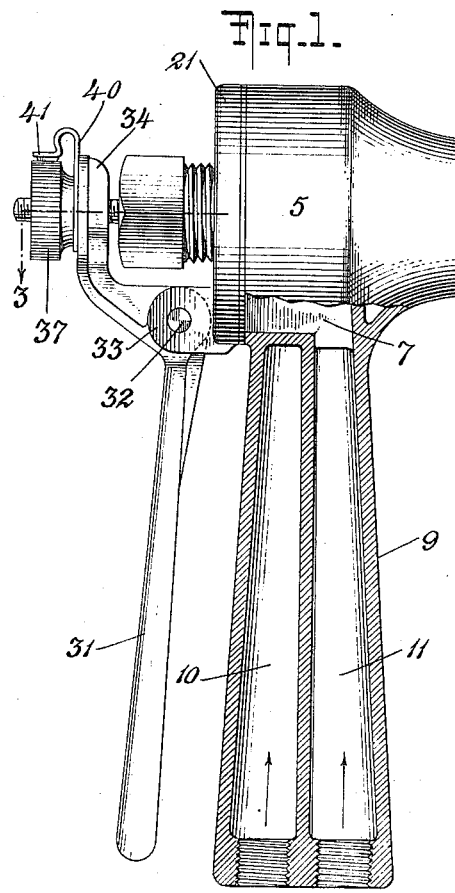
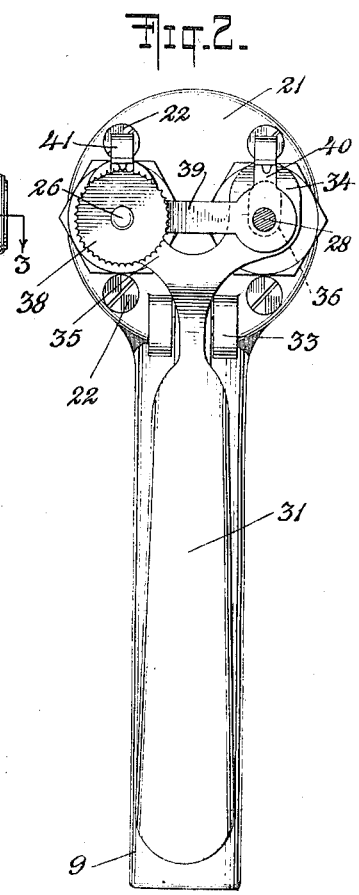
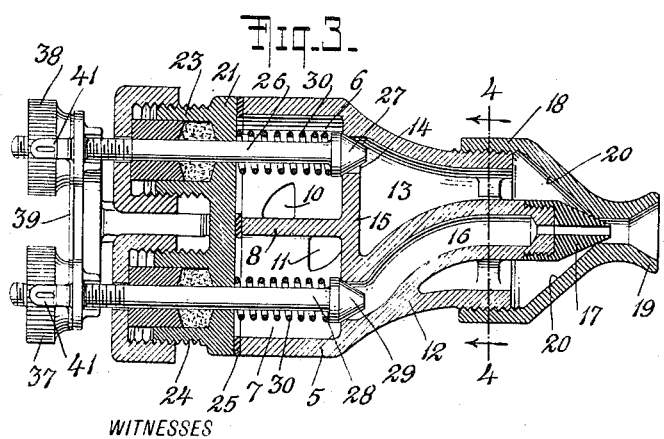
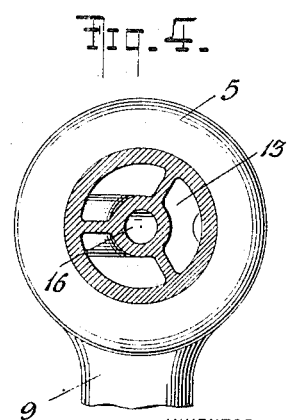
WITNESSES
George Du Bon
INVENTOR
GEORGE B. FURMAN
BY
ATTORNEYS

UNITED STATES PATENT OFFICE.

GEORGE B. FURMAN, OF EAST ORANGE, NEW JERSEY.

SPRAYING DEVICE.

1,268,232.  Specification of Letters Patent.  Patented June 4, 1918.

Application filed February 3, 1915. Serial No. 5,851.

*To all whom it may concern:*

Be it known that I, GEORGE B. FURMAN, a citizen of the United States, and resident of East Orange, county of Essex, State of New Jersey, have invented a certain new and useful Improvement in Spraying Devices, of which the following is a specification.

My invention relates to spraying devices and has for its object to provide a device of this type adapted to spray a germicide or other liquid or to discharge paint, varnish and like in the form of a mist. The particular purpose of my improvement is to construct a spraying device in such a manner that the same may be operated with a minimum of air or other pressure to produce maximum results and so as to be adjustable for effective service under all conditions and for various purposes. My invention will be fully described hereinafter and the features of novelty will be pointed out in the appended claims.

In the accompanying drawings which illustrate an example of my invention Figure 1 is a side elevation of my spraying device with parts in section; Fig. 2 is a rear elevation thereof; Fig. 3 is a horizontal section on the line 3—3 of Fig. 1 and Fig. 4 is a section on the line 4—4 of Fig. 3.

As shown in the drawings my improved spraying device comprises a casing 5 divided into two chambers 6 and 7 by means of a partition 8 and preferably forming an integral part of a handle 9 through which channels 10 and 11 extend lengthwise as illustrated in Fig. 1. The channel 10 is screw threaded at its lower end for connection with a source of compressed air or other fluid or gas under pressure and at its upper end communicates with the chamber 6 while the channel 11 is similarly screw-threaded at its lower end for connection with a supply of germicide, paint, or any other liquid and at its upper end is in connection with the chamber 7 of the casing 5. A preferably integral and tubular extension 12 projects forwardly from the casing 5 and forms an air space 13 in front of the same, the said air space 13 communicating with the chamber 6 through an opening 14 formed in a wall 15 located at the front portion of the shell 5. The said wall carries a tube 16 which communicates with the chamber 7 and has its forward end screw-threaded or otherwise formed to detachably receive the spraying nozzle 17 preferably having a tapering outer surface. The forward portion of the tube 16 and the nozzle 17 are in axial alinement with the axis of the extension 12 and project beyond the free end thereof as shown in Fig. 3. The said extension 12 is screw-threaded at its outer end to receive a cap 18 having a spraying spout 19 extending concentrically therefrom, in axial alinement with the nozzle 17, and being further provided with an interior surface 20 which converges toward said spraying spout 19. The casing 5 is closed at the rear by means of a cover 21 which is removably secured in position in any suitable manner as by means of screws 22 and carries stuffing boxes or the like 23 and 24 in axial registry respectively with the opening 14 and the inner end of the tube 16 as shown in Fig. 3. If desired a packing ring 25 or other suitable sealing means may be located between the cover 21 and the casing 5 to secure a tight connection. A valve stem 26 extends slidably through the stuffing box 23 and at its inner end carries a valve 27 coöperating with a suitable seat located at the opening 14 to control the communication between the chamber 6 and the air space 13. A similar valve stem 28 projects slidably through the stuffing box 24 and at its inner end carries a similar valve 29 coöperating with a suitable seat to control the communication between the chamber 7 and the tube 16. Coil springs 30 surround the stems 26 and 28 within the chambers 6 and 7 and serve to normally maintain the valves 27 and 29 in their operative positions to close the opening 14 and tube 16 respectively. In the illustrated example the means for operating both valves 27 and 29 comprises a single lever 31 extending lengthwise of the handle 9 and pivoted at 32 between lugs 33 secured to or forming part of the cap 21. The said lever 31 is continued above its pivot in the form of two arms 34 and 35 provided with elongated apertures 36 through which the valve stems 26 and 28 extend when the parts are operatively assembled. The free outer ends of the stems 26 and 28 are screw-threaded for the accommodation of nuts 37 and 38 which serve as adjustable abutments for the arms 34 and 35 to operatively connect said stems with the lever 31. In the preferred construction a bar 39 is located between the arms 34, 35 and the nuts 37, 38 and is provided with suitable apertures for the accommodation of the stems 26 and 28 whereby said bar is slidable lengthwise of said stems, it being understood that the apertures in the bar are of sufficient diameter to permit this operation and also to permit an angular movement of said bar relatively to the stems for the purpose to be more fully explained hereinafter. The said bar 39 carries upwardly projecting members 40 provided with resilient catches 41 adapted to coöperate with the milled peripheries of the nuts 37 and 38 to prevent the latter from shifting unintentionally after having been adjusted to a desired position. The catches 41 are of sufficient length and so located as to permit a separate adjustment of the nuts 37 and 38 relatively to each other within certain limits without becoming disengaged from the milled peripheries thereof.

In the condition of the device shown in Fig. 3 the inner end of the spout 19 of the cap 18 is in engagement with the tapering outer surface of the nozzle 17 so that the air space 13 and spout 19 are not in communication with each other. When it is desired to use the device the said cap 18 is rotated to move the spout 19 out of engagement with said nozzle 17 and to thus bring the air space 13 into communication with the spout 19 and the channels 10 and 11 are connected respectively with a source of compressed air or the like and a supply of the material which is to be sprayed or atomized. As shown in the drawings the cap 18 may be provided with projections 18ª on its outer surface whereby a manipulation of said cap relatively to the screw-threaded end of the projection 12 as above described is facilitated. If the lever 31 is now pressed toward the handle 9 the arms 34 and 35 will exert an outward pressure on the nuts 37 and 38 through the medium of the bar 39 and will slidably move the stems 26 and 28 in the stuffing boxes 23 and 24 and cause the valves 27 and 29 to move away from their respective seats. In this manner the air space 13 is brought into connection with the source of compressed air or the like and the tube 16 is likewise brought into communication with the supply of material to be sprayed. This material passes from the nozzle 17 into the spout 19 while at the same time air passes from the air space 13 along the converging surface 20 toward the said spout and completely and evenly envelops said material as it leaves the nozzle 17 so that a complete and thorough atomization takes place and an equal pressure exists at all parts of the spout. The result of this arrangement is that the material leaves the spout 19 in the form of a spray which may be adjusted and thrown in any direction by a proper manipulation of the handle. Owing to the location of the valve lever 31 relatively to the handle 9 the valves 27 and 29 are maintained in their open position in an easy and natural manner and without interfering with the free manipulation of the handle and the spout. The supply of air passing from the air space 13 may be regulated or entirely cut off by simply adjusting the cap 18 relatively to the nozzle 17 as will be clearly apparent from Fig. 3. By adjusting the nuts 37 and 38 on the stems 26 and 28 the extent to which the valves 27 and 29 are opened may be varied to increase or decrease the supply of air and material passing respectively into the air space 13 and through the tube 16. The said nuts 37 and 38 may also be set to cause said valves 27 and 29 to be opened simultaneously or adjusted relatively to each to cause one valve to be opened before the other, the bar 39 in this case assuming a position at an angle to the stems 26 and 28 as the lever 31 is operated. In other words with an adjustment such as last described the one arm, for instance 34 will force the bar 39 against the nut 37 before the arm 35 forces said bar 39 against the nut 38 with the result that the valve 27 will be opened before the valve 29 is actuated. In this manner the proportion of air and material may be equal or may be adjusted so as to vary the quantity of either and provide any desired unequal combination. As a result the character of the spray may be changed and the same may be confined within relatively reduced limits for application for instance to a small surface as in varnishing, painting or the like or caused to leave the spout in the form of a mist or fog covering a relatively large area and adapted for instance to thoroughly cover a tree or the like with a germicide or other liquid. The control of the valves under all conditions is accomplished by means of the single lever 31 so that an individual actuation of each valve is unnecessary and obviated and yet said valves may be independently adjusted in any desired manner which may become necessary or advisable.

Owing to the fact that in my improved construction the nozzle for the material extends in substantially the same direction in which the air travels at the exit end of the device it is unnecessary for the air to first overcome the velocity of the material before the same is atomized and operatively directed as is the case in constructions in which the material passes from an exit having its axis arranged at an angle to the axis of the exit from which the air passes. This arrangement coupled with the other features above enumerated results in a maximum of efficiency in the device with a minimum of air or other pressure. For instance in spraying fruit trees with a germicide or the like, I have found that a pressure of fifty pounds produce results equal to those necessitating a pressure of two hundred pounds in existing devices.

In my improved arrangement the nozzle 17 for the material is removable so that nozzles to adequately meet all requirements may be substituted, it being understood that in some instances the nozzle 17 may be constructed as an integral part of the tube 16 and with an outer end which is other than tapering. It will be apparent that the bar 39 and catches 41 may be replaced by equivalent devices or omitted entirely if desired; in this latter case the arms 34 and 35 would contact directly with the nuts 37 and 38 each time the lever 31 is operated. The converging surface 20 of the cap 18 causes the air to completely envelop and engage every particle of material passing from the nozzle 17 thus insuring a thorough and perfect atomization thereof and an equal pressure at all parts of the spout 19.

My improved device thus provides a simple and efficient construction not likely to become disarranged or out of order and adapted to be effectively used for atomizing or spraying many different materials.

Various changes in the specific form shown and described may be made within the scope of the claims without departing from the spirit of my invention.

I claim:

1. In a spraying device, an atomizing means, a handle forming a continuation of and extending transversely to said atomizing means and a plurality of conduits extending interiorly and lengthwise of said handle and communicating independently of each other with said atomizing means at points coincident with the connection between said handle and atomizing means, said conduits being arranged for connection respectively with a source of air or the like and with a source of material.

2. In a spraying device, an atomizing means including an air chamber and a material chamber each communicating independently of each other with the outlet of said atomizing means, a handle carried by and extending transversely to said atomizing means and provided with independent channels extending lengthwise of said handle and adapted for connection respectively with a source of fluid supply and with a source of material, said channels communicating respectively with said air chamber and said material chamber, valves for controlling the communication between said chambers and said outlet and a pivoted lever located in coöperative relation to said handle and operated by pressure relatively thereto for actuating said valves.

3. In a spraying device, an atomizing means including an air chamber and a material chamber, each communicating independently of each other with the outlet of said atomizing means, a handle carried by and extending transversely to said atomizing means and provided with independent channels extending lengthwise of said handle and adapted for connection respectively with a source of fluid supply and with a source of material, said channels communicating respectively with said air chamber and said material chamber, valves for controlling the communication between said chambers and said outlet, a pivoted lever extending transversely to said atomizing means in spaced relation to said handle and adapted to abut against the same under a pressure relatively to said handle whereby the movement of said lever in one direction is arrested and independently adjustable connections between said lever and each of said valves whereby the latter are concurrently or successively operated according to adjustment.

4. In a spraying device, an atomizing means including an air chamber and a material chamber each communicating independently of each other with the outlet of said atomizing means, a handle carried by and extending transversely to said atomizing means, valves controlling the communication between said chambers and said outlet, a lever extending lengthwise of and spaced from said handle and arranged to abut against the same whereby the movement of said lever in one direction is arrested and independently adjustable connections between said lever and each of said valves whereby the latter are concurrently or successively operated according to adjustment.

5. A spraying device comprising a casing provided with two separate chambers, a tubular extension forming an air space in front of said casing in communication with one of said chambers, a tube communicating with the other chamber and extending into said air space, a nozzle on said tube, a cap on said tubular extension, a spraying spout carried by said cap and projecting in the same direction as said nozzle, said cap being provided with a surface converging toward said spout, a handle connected with said casing and provided with interior channels communicating with said chambers, said channels being arranged for connection respectively with an air supply and with a source of material to be atomized, a valve controlling the connection between one of said chambers and said air space, a second valve controlling the connection between the other chamber and said tube, a pivoted lever extending lengthwise of said handle and arms extending from said lever and operatively connected with said valves.

In testimony whereof I have hereunto set my hand in the presence of two subscribing witnesses.

GEORGE B. FURMAN.

Witnesses:
 JOHN A. KEHLENBECK,
 FRED A. KLEIN.